United States Patent [19]
Drzewinski

[11] Patent Number: 5,378,763
[45] Date of Patent: Jan. 3, 1995

[54] MISCIBLE BLENDS OF POLYSULFONES AND AROMATIC ALKYL METHACRYLATE POLYMERS

[75] Inventor: Michael A. Drzewinski, Princeton Junction, N.J.

[73] Assignee: Enichem S.P.A., Milan, Italy

[21] Appl. No.: 969,456

[22] Filed: Oct. 30, 1992

[51] Int. Cl.[6] .................................... C08L 81/06
[52] U.S. Cl. ............................ 525/189; 525/534
[58] Field of Search ......................... 525/189, 534

[56] References Cited

U.S. PATENT DOCUMENTS

| | | | |
|---|---|---|---|
| 4,009,149 | 2/1977 | King et al. | 528/219 |
| 4,175,175 | 11/1979 | Johnson et al. | 525/434 |

FOREIGN PATENT DOCUMENTS

| | | | |
|---|---|---|---|
| 559772 | 7/1958 | Canada | 525/189 |
| 0259107 | 10/1990 | Japan | 525/189 |
| 0259108 | 10/1990 | Japan | 525/189 |
| 1335385 | 10/1973 | United Kingdom | 525/189 |

*Primary Examiner*—John C. Bleutge
*Assistant Examiner*—Helen F. Lee
*Attorney, Agent, or Firm*—Oblon, Spivak, McClelland, Maier & Neustadt

[57] ABSTRACT

Blends of an aromatic polysulfone (PSF) and aromatic alkyl methacrylates (PAAM) form thermodynamically miscible mixtures. They exhibit only one glass transition over a wide range of compositions and show marked improvement in mechanical and thermal properties compared to binary mixtures of PSF and other methacrylate or styrenic polymers. Furthermore, they possess better processing and workability without unwanted thermal decomposition owing to better flow properties at relatively lower temperatures.

16 Claims, No Drawings

MISCIBLE BLENDS OF POLYSULFONES AND AROMATIC ALKYL METHACRYLATE POLYMERS

BACKGROUND OF THE INVENTION

1. Field of the Invention

This invention relates to thermodynamically miscible, transparent single phase blends comprising: (I) an aromatic polysulfone (PSF); and (II) an aromatic alkyl methacrylate polymer (PAAM) such as polybenzyl methacrylate, polyphenylethyl methacrylate, or poly(2,6- dimethylphenyl)methacrylate.

2. Discussion of the Background

The term "thermodynamically miscible blend" defines a polymer mixture that mixes on the molecular level so as to form a single homogeneous phase which exhibits only one glass transition (Tg). This term is used in comparison to the term "mechanically compatible" which means that mixing of the polymers is on a small scale but larger than that of the molecules. Furthermore, mechanical compatibility implies that the multiple phases exhibit good adhesion to one another so as to yield good mechanical properties. Although both thermodynamically miscible and mechanically compatible blends exhibit good mechanical properties, only thermodynamically miscible systems are transparent owing to their single phase nature.

Aromatic polysulfones (PSF) typically are transparent, amorphous thermoplastics with a good balance of properties, most notably excellent electrical properties, creep resistance, high tensile strength, good thermal stability and resistance to many acids, bases and solvents. Nevertheless, they suffer from two major drawbacks. The first is that many potentially useful compositions are difficult to process. The second is that they have poor impact strength. Both of these drawbacks lead to relatively high production costs. This problem explains why only two such materials are commercially available, a polymer of 4-4'-chlorophenylsulfonylphenol, sold under the trade names of Victrex® and Ultrason® by ICI and BASF respectively, and a copolymer of 2,2-bis-4-hydroxyphenylpropane (Bisphenol A) with 4,4'-dichlorodiphenylsulfone, sold under the name Udel® by Amoco Performance Products.

Polyaromatic alkylmethacrylate polymers (PAAM) exhibit properties typical of most methacrylate polymers with the exception that they generally have higher heat resistance. Thus they exhibit good clarity, surface hardness, UV resistance, good weatherability and chemical resistance. For these reasons they can be used in applications where clarity and durability are essential. Although PAAM's have improved thermal stability over most alkyl methacrylate polymers, they are limited by their relatively poor dimensional stability compared to aromatic backbone-based polymers such as PSF.

Blends of polysulfones with other polymers could, in principle, eliminate the deficiencies of PSF and result in materials having considerably improved mechanical properties and ease of processability. Unfortunately PSFs are not thermodynamically miscible with most other polymers. Their blends are opaque materials and unacceptable for most applications requiring both transparency and mechanical performance. The two-phase nature of these blends does not improve the processability of the compositions either. Nonetheless, blend modification of polysulfone is known and practiced. Blends of polysulfones with polyvinylchloride (PVC), polystyrene, styrene-acrylonitrile copolymer (SAN), acrylonitrile-butadiene-styrene copolymer (ABS), styrenemethylmethacrylate copolymers, polyurethanes and nitrile rubbers have all been reported to be incompatible. (S. Kraus, chapter 2 in *Polymer Blends*, Academic Press, 1978). For commercial purposes, polysulfone is often blended with ABS to improve the polysulfone's inherently poor impact strength but this method results in loss of transparency due to the incompatibility of the two materials. Thus, one cannot maintain the beneficial properties of PSF and its clarity by use of ABS.

Structural changes to the backbone of polysulfones, such as methyl substitution, have also been reported and can bring about miscibility with certain polymers, e.g., SAN (Olabasi, et al in *Polymer-Polymer Miscibility*, Academic Press, 1979). Unfortunately, because of the complexity of these chemical modifications, such materials are not commercially viable. Therefore the need existed for transparent and easily processable polymer blends containing aromatic polysulfones.

We have found that blends of aromatic alkyl methacrylate polymers with aromatic polysulfones have a high degree of compatibility over all composition ranges and can overcome the deficiencies of PSF. They provide single phase, transparent alloys with a range of mechanical and optical properties suitable for a number of commercially viable applications. Thermodynamically miscible blends of PSF and PAAM eliminate the individual deficiencies of the respective components while resulting in materials having considerably improved mechanical properties and ease of processing for a wide range of applications. Most importantly this improvement in properties occurs without loss of transparency so that even the most demanding applications requiring both mechanical performance and optical clarity can be achieved.

SUMMARY OF THE INVENTION

An object of this invention is to provide thermo-plastically processable compositions that are transparent, single phase materials over the whole range of compositions and which contain an aromatic polysulfone (PSF) and an aromatic alkyl methacrylate polymer such as polybenzylmethacrylate, polyphenylethylmethacrylate, or poly(2,6-dimethylphenyl)methacrylate.

Another objective of this invention is to provide blends of PSF and PAAM that exhibit more satisfactory properties than either component alone and have lower processing temperatures compared to PSF itself.

DETAILED DESCRIPTION OF THE PREFERRED EMBODIMENTS

I have found that it is possible to achieve the above mentioned objectives with a thermodynamically miscible blend containing:

(I) 1 to 99 wt. % of an aromatic polysulfone (PSF) having the repeating unit:

$$+X_1-O-X_2-SO_2-X_3-O+,$$

$$+X_1-SO_2-X_2-O+ \text{ or}$$

$$+X_1-O-SO_2-Ar-X_3-O+$$

where $X_1$, $X_2$ and $X_3$ are substituted or unsubstituted aromatic moieties such as phenyl, naphthyl, diphenyl or polynuclear divalent radicals of the general formula:

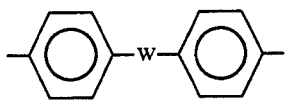

where W is an aliphatic, cycloaliphatic or arylaliphatic radical containing 0 to 8 carbons, —O—, —S—, —SO$_2$—, or carbonyl group; and a number average molecular weight of 5000 to 300,000 preferably 20,000 to 100,000; and (II) 99 to 1 wt. % of an aromatic alkyl methacrylate polymer (PAAM) having the general formula

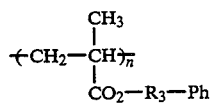

where R$_3$ is an alkylene radical having from 1 to 4 carbon atoms, Ph is a phenyl group and n is an integer from 10 to 5,000; or

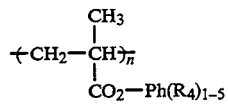

where R$_4$ is a C$_1$–C$_4$ alkyl group, Ph is a phenyl ring and n is an integer from 10 to 5000.

When X$_1$, is 2,2-bis(hydroxyphenyl)propane and X$_2$ and X$_3$ are phenyl the polysulfone component (I) is a commercially available polymer known as Udel ® sold by the Amoco Performance Products Corporation. Preferred examples of component (II) are polybenzyl methacrylate, polyphenyl ethyl methacrylate and poly(2,6-dimethylphenyl)methacrylate.

Surprisingly, the polymer blends of this invention are miscible over a wide range of compositions, however, most practically interesting blends contain 50 wt. % or more of the polysulfone component, preferably 60–80 wt. %.

The characteristics of PSF/PAAM blends depend upon the proportion of the components in the mixture. Generally, all of the present PSF/PAAM alloys can be made at will simply by mixing the components thoroughly. Blends containing a large proportion of PSF have higher mechanical properties like tensile strength, flexural strength and creep resistance. They also have higher thermal properties such as heat deflection temperature. In addition to providing modified properties through miscibility while retaining transparency, the addition of PAAM also aides in better workability. Thus, these blends overcome the inherent deficiencies of the respective individual components while maintaining compatibility and achieving transparency throughout a wide composition range.

The polymer blends of this invention constitute a new class of polymer alloys having numerous commercial applications owing to both mutual compatibility of the components and the net desirable set of properties which are more favorable than those of any individual component. These blends can be used for example in the packaging industry in the form of containers, foils, films, coatings and laminates where the individual components are currently used but they possess better optical and mechanical properties. Another application for these alloys is in articles requiring excellent thermal and electrical properties together with good transparency. Thus, the compositions of the present invention may find use in the automotive industry for underhood wiring, electrical components, housings, interior decoration and protective components. These modified polysulfone blends can also be used in a variety of applications including medical instruments, trays, food processing equipment, housings, pump casings and microwave cookware. Still other applications include transformers, electrical connectors, dielectric capacitors and printed circuit boards.

Polysulfones which can be used in the preparation of the blends of this invention are exhaustively described in a number of patents including U.S. Pat. Nos. 3,634,355; 3,647,751; 4,009,149; 4,107,837; 4,175,175; 4,957,978 and British No. 1,153,035. Such materials are also commercialized by ICI and BASF under the trade names of Victrex ® and Ultrason ®, respectively.

In general, the synthetic methods disclosed in these patents are applicable for the synthesis of a broad range of poly(arylethersulfones). Victrex ® is produced by polycondensation of 4-(4'-chlorophenylsulfonyl)phenyl. Ultrason ® is prepared by nucleophilic polycondensation of 2,2-bis(4-hydroxyphenyl)propane (bisphenol-A) with 4,4'-dichlorophenylsulfone. Other suitable PSFs include polymers based on the monomers of

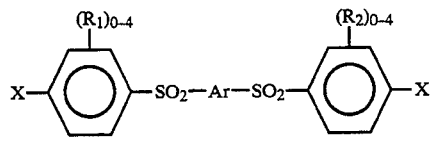

where X is a halogen, preferably chlorine or fluorine, or a hydroxyl group; Ar is a divalent aromatic radical selected from biphenylene, terphenylene, napthylene, and anthracine; and R$^1$ and R$^2$ are independently hydrogen, C$_1$–C$_4$-alkyl or alkoxy. In general, these polymers are produced by polycondensation of a dihydric phenol and an activated dihalobenzenoate compound. Suitable dihydric phenols are weakly acidic compounds, e.g., the dihydroxydiphenylalkanes such as 2,2-bis(4-hydroxyphenyl)propane, 1,1-bis(4-hydroxyphenyl)2-phenylethane, bis(4-hydroxyphenyl)methane, or their chlorinated derivatives containing one or two chlorine atoms on each aromatic ring.

In the examples, a commercially available polysulfone based on bisphenol A was obtained from Scientific Polymer Products which is similar to Udel ® 1700 available from Amoco. It is characterized by an approximate number average molecular weight of 80,000 and a glass transition (Tg) of 192° C. In general the number average molecular weight of the polysulfone should be between 5,000 and 300,000 and more preferably between 20,000 and 100,000, although any molecular weight can be used.

The preferred blends of this invention are binary blends containing a polysulfone and a polyaromatic alkyl methacrylate. However, copolymers (block, graft, segmented, random, etc.) containing PAAM portions are also thermodynamically miscible with PSF.

The polyaromatic alkyl methacrylates of this invention can be produced by a number of synthetic methods including various free radical, ionic and coordination techniques. Azo compounds such as azo(bis- )isobutyronitrile, peroxides such as dibenzoyl peroxides or redox systems can be used as radical polymerization initiators. General methods of producing these homopolymers are disclosed in "Polymerization of Acrylate and Methacrylate Esters", *Polymer Synthesis*, A Series of Monographs, S. R. Sandler and W. Karo eds., Chapter 10, Volume 29-I, Academic Press, Inc., New York, 1974.

The polymers typically have number average molecular weights in the range of 10,000 to 2 million, more preferably within the range of 20,000 to 300,000, although this is not very critical to the basis of this invention. Preferred materials include commercially available polybenzyl methacrylate (Scientific Polymer Products or Polysciences, Inc.) having a molecular weight of about 70,000 or polyphenylethyl methacrylate, available from Scientific Polymer Products, at a molecular weight of about 190,000. Poly(2,6-dimethylphenyl)methacrylate was synthesized from the corresponding monomer using traditional free radical solution polymerization in toluene (see Example 4) and was found to have a number average molecular weight of about 40,000, as measured by GPC, and a glass transition temperature of 150° C.

Suitable block copolymers have at least one block consisting of a polyaromatic(alkyl)methacrylate, such as polybenzyl methacrylate and a second block, e.g., polyisoprene, which is capable of imparting improvements to PSF, such as thick section or low temperature toughness. In addition, one may also add the corresponding homopolymers of the block copolymer (e.g. polyphenylmethacrylate and/or polyisoprene) in amounts of 0–15 wt. % compared to the total weight of the PSF and the PAAM block copolymer, in order to widen the property variations possible while still maintaining clarity. Furthermore, if one chooses, more than 15% of the corresponding homopolymers may be added to achieve a wider variation in properties but at the loss of transparency.

Block copolymers are of general diblock, triblock and multiblock structures represented by the formulae A-b-B, A-B-A, B-A-B or (A-B)$_n$, where the A block is an aromatic(alkyl)methacrylate and the B block is a rubbery polymer capable of imparting improvement in PSF properties particularly thick section and low temperature toughness. Examples of B type polymers are polyisoprene, polybutadiene, polylauryl methacrylate, polybutyl acrylate and polyC$_1$–C$_{10}$-alkylacrylates. In addition, styrenics, such as polystyrene and polyC$_1$–C$_4$-alkylstyrene, dienic rubbers and siloxane elastomers are suitable.

Triblock copolymers are usually prepared by one of three methods: sequential addition of monomers, reactive coupling or difunctional initiation. In the first method, the monomers are reacted in sequence as implied so as to form an A-B-A type material. In the second method an A-B type material is initially produced but is coupled while still reactive so as to form an A(BB)-A or simply A-B-A triblock. The coupling reaction occurs by addition of a difunctional linking material including certain diester, diorganohalogen, silicon dihalides, and iminic compounds. Examples of these coupling agents have been reviewed and patented. ("Thermoplastic Elastomers", eds. N. Legge, G. Holden & H. Schroeder, MacMillan Publishing, New York, 1987;, "Handbook of Thermoplastic Elastomers", 2nd ed. eds. B. Walker and C. Rader, Van Nostrand Publishers, New York, 1988; U.S. Pat. No 4,754,005).

The third method of difunctional initiation works by polymerizing the material from the inside cut by beginning the polymerization of the "B" block first, on both ends simultaneously, and then the addition of the "A" monomer leads to the A-B-A structure. Examples of such initiators include: 2:1 n-butyl lithium:1, 3-bis(1-phenylethenyl)benzene; m-xylene dianions prepared by addition of m-xylene to two equivalents of Lochmann's base (1:1 n-butyl lithium: potassium t-butoxide complex in hexane); and 2:1 n-butyl lithium: m-disopropenylbenzene. The synthesis and use of these materials has been documented. (Polymer International, 24, 197, 1991; ACS Polymer Preprints, April 1989S 150–151; and "Recent Advances in Anionic Polymerizations", eds. T. Hogen-Esch & J. Smid, Elsevier Publishers, Netherlands, 1987)

A general synthesis of well defined methacrylic ester-containing block copolymers has only recently been accomplished (See for example: "Recent Advances in Mechanistic and Synthetic Aspects of Polymerization", Kluwer Academic Publishers, Norwell, Mass., 1987; and "Recent Advances in Anionic Polymerizations", Elsevier Publishing Co., New York, N.Y., 1987). These reports have focused primarily on polymers containing blocks of polymethyl methacrylate or polybutyl methacrylate made by an anionic mechanism. Typically, anionic polymerization is used for the synthesis of well defined block copolymers because the reaction has no naturally occurring termination step. However, the presence of carbonyl groups initially caused problems with the polymerization of methacrylate monomers until methods were developed to prevent attack on the carbonyl groups. The most commonly accepted method is the combined use of low temperature polymerization ($-78°$ C.) and modification of the initial anion, either by prereaction with 1,1-diphenylethylene or by variation of its reactivity by reaction/chelation with pyridine and/or LiCl.

Generally, the PAAM block should be above 10,000 g/mole in molecular weight and more preferably in the 12,000 to 5,000 g/mole range, although any desired molecular weight can be made. Similarly, the second block should also be above 10,000 g/mole and more preferably in the 30,000 to 150,000 range. The relative ratios of the two blocks can be varied as well depending on the resultant property variation desired. For thick section toughness and low temperature impact strength, one should prepare a material containing predominately the second block, e.g., polyisoprene, with a PAAM/polyisoprene ratio of about 1:3 to 1:5. The weight ratios of each block are generally 0.1:1 to 1:1, preferably 0.5:1 to 1:1.

Copolymers containing dienic monomers such as polybutadiene and polyisoprene can be hydrogenated resulting in improved thermal and oxidative stability over the original dienic materials. There are many methods of hydrogenation but the most preferable are catalytic hydrogenations using mixed systems containing a transition metal salt (usually based on cobalt or nickel) and a reducing agent such as triethyl aluminum or n-butyl lithium. Examples include homogenous cobalt chloride/pyridine/triethyl aluminum complexes; homogeneous nickel octanoate/triethyl aluminum complexes; and homogeneous rhodium systems such as [P(C$_6$H$_5$)$_3$RhCl]. Heterogenous systems can also be used by supporting active catalysts such as [P(C$_6$H$_5$)$_3$RhCl] on inert substrates such as silica, zeolites, carbon black, etc. Details of hydrogenation can be found in many reviews such as in the "Encyclopedia of polymer Science and Engineering" 2nd edition, Volume 7, John Wiley & Sons, New York, 1987.

Simultaneous, free radical polymerization of two or more monomers usually leads to random copolymers of varying composition. The general methodology used to produce random copolymers is the same as free radical homopolymerization.

Free radical initiated graft polymerization, in general, is closely related to vulcanization reactions in that active radical sites are created on the backbone chain in the presence of monomer. This can be done either in the bulk or in solution. Mechanistically these reactions are similar to free radical homopolymerization. These methods are discussed in detail in "Organic Chemistry of Synthetic High Polymers", R. Lenz, Interscience Publishers, New York, 1967.

Suitable graft or random copolymers of component (II) are those containing monomers selected from dienes, substituted dienes, olefins, substituted olefins, acrylates, methacrylates, styrenics, vinyl aromatics, and siloxanes.

The mixtures of this invention may contain additives or modifiers such as fillers, stabilizers, antioxidants, pigments, dyes, impact modifiers, flame retarders, plasticizers etc. Antioxidants include phenolics, hindered amines, thioesters, and phosphite compounds. Suitable dyes, pigments and special color concentrates include a wide variety of chemical compounds, both organic and inorganic. Leading suppliers include Ferro, Harwick, Ciba-Geigy and Crowley.

Flame retardants include aluminum hydrates, halogenated compounds, antimony trioxide and phosphate esters. They are sold by a wide variety of companies including Mobay, Ferro, Harwick and Akzo.

Ultraviolet stabilizers are quite complex compounds but are generally of the benzophenone, benzotriazole or nickel-organic types. They are sold by Ciba-Geigy, BASF, Ferro, American Cyanamid.

Suitable fillers include aramid fibers, glass fibers, ceramic fibers, metal fibers, carbon fibers, fillers such as glass beads, minerals such as calcium carbonate, kaolin, talc, micas and silicas.

In order to maintain the transparent characteristics of these blends, such additives must also be miscible with the ternary blend. One may chose, however, to forego the transparent property, opting for greater improvement in some other property by the use of an immiscible additive. Thus, any blend consisting essentially of a polysulfone and a polyaromatic alkyl methacrylate is considered within the scope of this invention. Typically, any additional material will not exceed 20 wt. % based on the combined weight of all other ingredients.

The mixing of the components of this invention can be undertaken by many means such as co-dissolution in a common solvent as well as by various thermal and mechanical processing such a roll milling, blade mixing, screw extrusion and the like. The resultant blend can be further processed/shaped by similarly known methods of extrusion and molding.

The blends of this invention are transparent thermoplastics with a wide range of properties, in particular more favorable properties, than those exhibited by either component alone. This includes, but is not limited to, improvements in processability, heat and dimensional stability, electrical and flame retardant properties and the like. The subject of this invention can be further illustrated with the aid of the following examples. Other features of the invention will become apparent in the course of the following descriptions of exemplary embodiments which are given for illustration of the invention and are not intended to be limiting thereof.

EXAMPLE 1

Polysulfone based on Bisphenol A of approximate number average molecular weight 80,00 and Tg of 192° C. (Scientific polymer Products) and polybenzyl methacrylate of number average molecular weight 70,000 (Scientific Polymer Products) were solution blended in chloroform at various weight ratios and each blend coagulated into isopropanol, filtered and dried under vacuum at 80° C. for several hours. Each blend was then tested by differential scanning calorimetry (DSC) after first being heated to 275° C under nitrogen to remove any non-equilibrium effects and to simulate melt blending. Compression molded films of these materials were transparent to the naked eye. The DSC was run from 25° to 275° C. at 20° C./minute and the glass transition of the mixtures recorded. The results are contained in Table 1. The single glass transition exhibited by these blends is consistent with the well known behavior for thermodynamically miscible polymer blends.

EXAMPLE 2

The Polysulfone of Example 1 and polyphenylethyl methacrylate of number average molecular weight 190,000 (Scientific Polymer Products) were solution blended in chloroform at various weight ratios and each blend coagulated into isopropanol, filtered and dried under vacuum at 80° C. for several hours. Each blend was then tested by differential scanning calorimetry (DSC) after first being heated to 275° C. under nitrogen to remove any non-equilibrium effects and to simulate melt blending. Compression molded films of these materials were transparent to the naked eye. The DSC was run from 25° to 275° C at 20° C./minute and the glass transition of the mixtures recorded. The results are contained in Table 1. The single glass transition exhibited by these blends consistent with the well known behavior for thermodynamically miscible polymer blends.

EXAMPLE 3

The polysulfone of Example 1 and poly(2,6-dimethylphenyl)methacrylate of number average molecular weight 40,000 made by conventional free radical polymerization of the corresponding monomer, as in Example 4, were solution blended in chloroform at various weight ratios and each blend coagulated into isopropanol, filtered and dried under vacuum at 80° C. for several hours. Each blend was then tested by differential scanning calorimetry (DSC) after first being heated to 275° C. under nitrogen to remove any non-equilibrium effects and to simulate melt blending. Compression molded films of these materials were transparent to the naked eye. The DSC was run from 25° to 275° C. at 20° C./minute and the glass transition of the mixtures recorded. The results are contained in Table 1. These blends also exhibited a single glass transition temperature.

Comparative Example 1

The polysulfone of Example 1 and polymethyl methacrylate of number average molecular weight 75,000 (Scientific Polymer Products) were solution blended in chloroform at various weight ratios and each blend coagulated into isopropanol, filtered and dried under vacuum at 80° C. for several hours. Each blend was then tested by differential scanning calorimetry (DSC) after first being heated to 275° C. under nitrogen to remove any non-equilibrium effects and to better simulate melt blending. Compression molded films of these materials were opaque to the naked eye. The DSC was run from 25° to 275° C. at 20° C./minute and the glass transition(s) of the mixtures recorded. The results are contained in Table 1. The presence of two glass transitions near those of the respective homopolymers exhibited by is indicative of thermodynamic incompatibility.

Comparative Example 2

The polysulfone of Example 1 (Scientific Polymer Products) and polycyclohexyl methacrylate of number average molecular weight 65,000 (Scientific Polymer Products) were solution blended in chloroform at various weight ratios and each blend coagulated into isopropanol, filtered and dried under vacuum at 80° C. for several hours. Each blend was then tested by differential scanning calorimetry (DSC) after first being heated to 275° C. under nitrogen to remove any non-equilibrium effects and to simulate melt blending. Compression molded films of these materials were opaque to the naked eye. The DSC was run from 25° to 275° C. at 20° C./minute and the glass transition(s) of the mixtures recorded. The results are contained in Table 1. The presence of two glass transitions near those of the respective homopolymers is indicative of thermodynamic incompatibility.

Comparative Example 3

The polysulfone of Example 1 and polybenzyl acrylate of number average molecular weight 100,000 (Scientific Polymer Products) were solution blended in chloroform at various weight ratios and each blend coagulated into isopropanol, filtered and dried under vacuum at 80° C. for several hours. Each blend was then tested by differential scanning calorimetry (DSC) after first being heated to 275° C. under nitrogen to remove any non-equilibrium effects and to simulate melt blending. Compression molded films of these materials were opaque to the naked eye. The DSC was run from 25° to 275° C. at 20° C./minute and the glass transition(s) of the mixtures recorded. The results are contained in Table 1. The presence of two glass transitions near those of the respective homopolymers is indicative of thermodynamic incompatibility.

Example 4

Poly(2,6-dimethylphenyl)methacrylate was polymerized by placing 20 ml of the monomer in 50 ml of dry toluene under an Argon purge. 0.3 grams of a commercial free radical initiator, VAZO-67 (DuPont Chemical) was then added after first heating the toluene/monomer solution to 75° C. The reaction ran for 30 hours at 75° C. after which time the contents were poured into methanol to precipitate the polymer. Following filtration, washing and drying the polymer was analyzed by GPC and found to have a number average molecular weight of about 40,000. DSC revealed a glass transition temperature of about 150° C.

TABLE 1

| PSF/X | Example #1 | Example #2 | Example #3 | Comparative Example #1 | Comparative Example #2 | Comparative Example #3 |
|---|---|---|---|---|---|---|
| 100/0 | 192° | 192° | 192° | 192° | 192° | 192° |
| 85/15 | 168° | — | 184° | — | — | — |
| 70/30 | 150° | 147° | 176° | 180°/110° | 190°/90° | 189°/15° |
| 60/40 | 141° | 129° | — | — | — | — |
| 40/60 | 131° | 103° | — | — | — | — |
| 30/70 | 105° | 94° | 173° | 162°/101° | 170°/90° | 184°/15° |
| 15/85 | 99° | — | 154° | — | — | — |
| 0/100 | 67° | 20° | 152° | 101° | 90° | 15° |

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A resin composition comprising:
   (I) 1 to 99 wt. % of an aromatic polysulfone containing the repeating unit

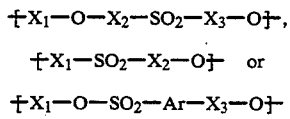

where $X_1$, $X_2$ and $X_3$ are substituted or unsubstituted aromatic moieties selected from phenyl, naphthyl, diphenyl or polynuclear divalent radicals of formula:

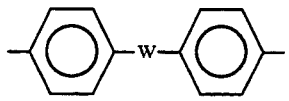

where W is an aliphatic, cycloaliphatic or arylaliphatic radical containing 0 to 8 carbons, —O—, —S—, —$SO_2$—, or carbonyl group; Ar is a divalent substituted or unsubstituted aromatic radical selected from biphenylene, terphenylene, napthylene or anthracine; said aromatic substituents are selected from halogen, $C_1$–$C_4$-alkyl or $C_1$–$C_4$-alkyl groups and (II) 99 to 1 wt. % of an aromatic alkyl methacrylate homopolymer containing the repeating unit

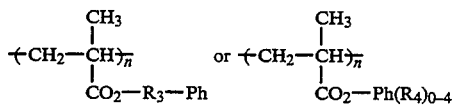

where $R_3$ is a $C_1$–$C_4$ alkylene radial, $R_4$ is a $C_1$–$C_4$ alkyl group, Ph is a phenyl ring and n is an integer from 10 to 5,000.

2. The composition of claim 1 containing 50–90 wt. % of component (I).

3. The composition of claim 1 containing 50–90 wt. % of component (II).

4. The composition of claim 1 containing 60–80 wt. % of component (I).

5. The composition of claim 1 wherein component (II) has a number average molecular weight of 5,000 to 300,000.

6. The composition of claim 1 wherein component (II) has a number average molecular weight of 40,000 to 100,000.

7. The composition of claim 1 wherein component (I) has a number average molecular weight of 20,000 to 300,000.

8. The composition of claim 1 wherein the polysulfone contains 4-(4'-chlorophenylsulfonyl)phenol moieties.

9. The composition of claim 1 where the polysulfone contains 2,2-bis(4-hydroxyphenyl)propane and 4,4¹-dichlorophenylsulfone moieties.

10. The composition of claim 8 wherein component II is polybenzylmethacrylate.

11. The composition of claim 8 wherein component II is polyphenylethyl methacrylate.

12. The composition of claim 8 wherein component II is poly(2,6-dimethylphenyl)methacrylate.

13. The composition of claim 9 wherein component II is polybenzylmethacrylate.

14. The composition of claim 9 wherein component II is polyphenylethyl methacrylate.

15. The composition of claim 12 wherein component II is poly(2,6-dimethylphenyl)methacrylate.

16. The composition of claim 1 wherein $X_1$, $X_2$ and $X_3$ are unsubstituted.

* * * * *